United States Patent Office 2,772,311
Patented Nov. 27, 1956

2,772,311

HYDROGENATING KETIMINOMAGNESIUM HALIDE INTERMEDIATES WITH LITHIUM ALUMINUM HYDRIDE TO PRODUCE AMINES

Albert Pohland, Indianapolis, Ind., assignor to Eli Lilly and Company, Indianapolis, Ind., a corporation of Indiana No Drawing. Application June 29, 1953,
Serial No. 364,953

5 Claims. (Cl. 260—570)

This invention relates to a process for the preparation of disubstituted carbinamines.

The course of the new process is illustrated by the following equations:

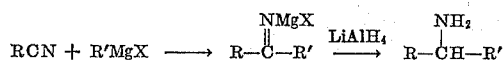

wherein R and R' represent alkyl, aryl, aralkyl, alkaryl, substituted alkyl, substituted aryl and substituted alkaryl radicals, and X represents a halogen atom, preferably a chlorine, bromine or iodine atom.

Referring to the equations, it will be seen that a nitrile is reacted with a Grignard reagent to produce a disubstituted ketiminomagnesium halide, which upon reduction with lithium aluminum hydride yields a disubstituted carbinamine. The process of this invention utilizes readily available starting materials, and affords a means of preparing amines which are difficult to obtain by other processes. Moreover, the process is of quite general applicability and a wide variety of Grignard reagents and substituted nitriles can successfully be employed in it. It will be understood, however, that functional groups capable of forming complexes with Grignard reagents, other than the cyano group, are not to be present in the substituted nitrile.

Broadly speaking, in carrying out my new process the Grignard reagent employed is prepared in solution in an inert solvent, for example, in ether, benzene, xylene, toluene and the like, according to the usual methods, and the nitrile is added thereto. The reaction will proceed at room temperature, but to increase the speed of the reaction the mixture can be heated in any degree, up to the boiling point of the solvent. The intermediate complex, formed by the reaction of the Grignard reagent with the substituted nitrile, is not isolated, but instead the lithium aluminum hydride for the reduction is added directly to the reaction mixture containing the complex, either in solid form or in the form of a slurry in an inert solvent, such as a hydrocarbon solvent, tetrahydrofuran, ether, ethylmorpholine and the like. To insure completion of the reaction, a slight excess of lithium aluminum hydride is used, and preferably about 1.2 moles of lithium aluminum hydride are employed for each mole of the Grignard complex. To hasten the speed of the reduction, the reaction mixture containing lithium aluminum hydride can be heated as before, up to the boiling point of the solvent. Upon completion of the reduction, any excess of lithium aluminum hydride, and the lithium and aluminum salts formed in the reaction, are removed in the usual way, for example, by the addition of water and alkali, followed by filtration and separation of the organic layer. The product of the process can readily be isolated by fractional distillation and the like.

Compounds which are typical of substances which can be prepared by the novel process are 1-phenylpropylamine, 1-(p-methoxyphenyl)-2-phenethylamine, 2-amino-1-phenylbutane, 1-(p-methylphenyl)-2-aminobutane, 3-aminopentane, 2-aminoheptane, 1-phenylhexylamine, 2-aminopropane, 1-phenyl-2-methyl-3-piperidinopropylamine, 1-phenyl-2-aminopropane, 1,2-diphenethylamine, 3-aminooctane, 4-diethylamino-1-phenylbutylamine, and the like.

The following specific illustrations exemplify the new process.

EXAMPLE 1

*Preparation of 1-phenylpropylamine*

A Grignard reagent was prepared from 47.3 g. (0.30 mol.) of bromobenzene, 7.2 g. (0.30 mol.) of magnesium and 300 ml. of ether. The solution of the Grignard reagent was stirred, and 13.8 g. (0.25 mol.) of propionitrile were added dropwise. After the addition was complete, the reaction mixture was refluxed for about two hours on a steam bath. A slurry of 11.4 g. (0.3 mol.) of lithium aluminum hydride in 100 ml. of tetrahydrofuran was slowly added, and the reaction mixture was then heated to boiling under reflux for about eighteen hours. The mixture was cooled, and successively there were added 12 ml. of water, 9 ml. of 20 percent aqueous sodium hydroxide, and 42 ml. of water. The precipitate of inorganic material which formed was collected and removed by filtration, and washed with ether. The combined filtrate and ether washings were distilled in vacuo. The fraction boiling at about 78–80° C. (at a pressure of 7.0 mm. of mercury), and comprising the 1-phenylpropylamine formed in the reaction, was collected. A total amount of 27.1 g. of 1-phenylpropylamine, a yield equal to 80 percent of theory, was obtained. The refractive index of 1-phenylpropylamine thus prepared was as follows: $n_D^{25} = 1.5186$.

EXAMPLE 2

*Preparation of 2-amino-1-phenylbutane*

A Grignard reagent was prepared from 38.0 g. (0.3 mol.) of benzyl chloride, 19.0 g. (0.78 mol.) of magnesium and 300 ml. of ether. The solution of the Grignard reagent was stirred and 13.8 g. (0.25 mol.) of propionitrile were added dropwise. The reaction mixture was refluxed for two hours, and 7.6 g. (0.2 mol.) of lithium aluminum hydride in 100 ml. of tetrahydrofuran were added thereto. The resulting mixture was refluxed for about sixteen hours, and thereafter decomposed, with cooling, by the addition of successive portions of 8 ml. of water, 6 ml. of 20 percent aqueous sodium hydroxide and 28 ml. of water. The precipitated salts were removed by filtration and washed with ether. The combined filtrate and washings were dried over magnesium sulfate and fractionally distilled in vacuo. The 2-amino-1-phenylbutane formed in the reaction was collected and found to boil at about 98–99° C. at a pressure of 10 mm. of mercury. There were obtained 21 g. of 2-amino-1-phenylbutane having the following index of refraction: $n_D^{25} = 1.5128$.

EXAMPLE 3

*Preparation of 3-aminopentane*

The procedure of Example 1 was followed, except that a Grignard reagent was prepared from 32.7 g. (0.3 mol.) of ethyl bromide, and 7.2 g. (0.3 mol.) of magnesium and 300 ml. of ether were used. After decomposition with water and alkali, the organic phase was removed and added to 200 ml. of dilute aqueous hydrochloric acid. The mixture was concentrated to about 75 ml. by evaporation in vacuo, and 50 percent aqueous sodium hydroxide was added thereto. The 3-aminopentane liberated was extracted with ether. The ether extract was dried over anhydrous magnesium sulfate and fractionally distilled.

3-aminopentane thus prepared boiled at about 87° C. under atmospheric pressure and had the following refractive index: $n_D^{25} = 1.4030$. A yield of 4.8 g. of 3-aminopentane was obtained.

EXAMPLE 4

*Preparation of 4-diethylamino-1-phenylbutylamine*

The procedure of Example 1 was followed, except that 29 g. (0.2 mol.) of 4-diethylaminobutyronitrile were used instead of the propionitrile.

4 - diethylamino - 1 - phenylbutylamine thus prepared boiled at 115–116° C. at a pressure of 0.8 mm. of mercury and had the following index of refraction: $n_D^{25}=1.5081$. A yield of 27.5 g., about 66 percent of theory, was obtained.

EXAMPLE 5

*Preparation of 1-phenylhexylamine*

The procedure of Example 1 was followed, except that 24.3 g. (0.25 mol.) of n-capronitrile were used instead of propionitrile.

1-phenylhexylamine thus prepared boiled at about 82–83° C. at a pressure of 0.9 mm. of mercury. There were obtained 23.6 g. of the product, having the following index of refraction: $n_D^{25}=1.5070$.

EXAMPLE 6

*Preparation of 1-phenyl-2-methyl-3-piperidino-propylamine*

The procedure of Example 1 was repeated, except that 38.1 g. (0.25 mol.) of β-piperidinoisobutylnitrile were used instead of propionitrile.

A yield of 30.2 g. of 1-phenyl-2-methyl-3-piperidino-propylamine, boiling at about 119–120° C. at a pressure of 0.6 mm. of mercury was obtained. The compound had the following index of refraction: $n_D^{25}=1.5271$.

EXAMPLE 7

The procedure of Example 1 was repeated, except that 29.3 g. (0.25 mol.) of phenylacetonitrile were used instead of propionitrile.

1,2-diphenethylamine thus prepared boiled at about 150–151° C. at a pressure of 2.0 mm. of mercury. A yield of 8.6 g. of 1,2-diphenethylamine was obtained.

I claim:

1. A process for the preparation of carbinamines, which comprises the steps of bringing together, with the formation of a ketiminomagnesium halide, a nitrile having the formula RCN, and a Grignard reagent having the formula R'MgX, wherein R and R' represent members of the group consisting of lower alkyl, monocarbocyclic aryl, and phenyl-substituted lower alkyl radicals, said radicals being free from substituents which are capable of reacting with a Grignard reagent, and X represents a halogen atom; and hydrogenating the resulting product with lithium aluminum hydride.

2. The process for the preparation of carbinamines which comprises the steps of bringing about Grignard complex formation in inert solvent solution between a nitrile having the formula RCN and a Grignard reagent having the formula R'MgX, wherein R and R' represent members of the group consisting of lower alkyl, monocarbocyclic aryl, and phenyl-substituted lower alkyl radicals, said radicals being free from substituents which are capable of reacting with a Grignard reagent, and X represents a halogen atom; and adding lithium aluminum hydride to the reaction mixture containing the Grignard complex to cause hydrogenation of the complex and the formation of an amine having the formula

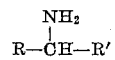

wherein R and R' have the same significance as hereinabove.

3. The process for the preparation of carbinamines which comprises the steps of bringing about in inert solvent solution the formation of a Grignard complex between a nitrile having the formula RCN and a Grignard reagent having the formula R'MgX wherein R and R' represent members of the group consisting of lower alkyl, monocarbocyclic aryl, and phenyl-substituted lower alkyl radicals, said radicals being free from substituents capable of reacting with a Grignard reagent, and X represents a halogen atom; adding lithium aluminum hydride to the reaction mixture to hydrogenate the Grignard complex with the formation of an amine having the formula

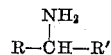

wherein R and R' have the same significance as hereinabove, decomposing inorganic complexes formed during the hydrogenation by the addition of dilute aqueous alkali, removing insoluble substances from the reaction mixture, and recovering the amine therefrom by fractional distillation.

4. In the process for the preparation of carbinamines, the step which comprises the reduction of a Grignard complex, formed by the condensation of a nitrile and a Grignard reagent, with lithium aluminum hydride.

5. The process according to claim 4, wherein about 1.2 mols of lithium aluminum hydride are used for each mol of the Grignard complex.

References Cited in the file of this patent

Fuson et al.: "Org. Chem." (1947), p. 270.